United States Patent [19]

Ajiro

[11] Patent Number: 5,835,569
[45] Date of Patent: Nov. 10, 1998

[54] COMMUNICATION TERMINAL EQUIPMENT FOR RECEIVING AND SENDING MESSAGE INFORMATION AND THE CONTROL METHOD THEREOF

[75] Inventor: Atsushi Ajiro, Tokyo, Japan

[73] Assignee: Sony Corporation, Tokyo, Japan

[21] Appl. No.: 668,149

[22] Filed: Jun. 21, 1996

[30] Foreign Application Priority Data

Jun. 30, 1995 [JP] Japan ................................ 7-188461

[51] Int. Cl.$^6$ ...................................................... H04M 1/64

[52] U.S. Cl. .............................. 379/67; 379/70; 379/88; 455/412

[58] Field of Search .................................. 379/67, 88, 89, 379/68, 70, 85; 455/412, 413

[56] References Cited

U.S. PATENT DOCUMENTS 5,452,289   9/1995   Sharma et al. ............................ 379/93
5,557,659   9/1996   Hyde-Thomson ........................ 379/88

*Primary Examiner*—Fan S. Tsang
*Attorney, Agent, or Firm*—Jay H. Maioli

[57] ABSTRACT

A communication terminal equipment and the control method thereof, which display the message information read out from an information storing device on a display device, and perform a desired processing with respect to the displayed message information by simple inputting. The message information stored in the storing device is read out to display the message information on the display. The device and a plurality of setting items showing the corresponding processing with respect to the displayed message information are displayed on the display device. Then one of the setting items is selected from a plurality of setting items by an inputting device to execute the corresponding processing by a control device.

6 Claims, 5 Drawing Sheets

COMMUNICATION TERMINAL EQUIPMENT FOR RECEIVING AND SENDING MESSAGE INFORMATION AND THE CONTROL METHOD THEREOF

BACKGROUND OF THE INVENTION

1. Field of the Invention

This invention relates to a communication terminal equipment and communication method, more particularly, and is applicable to use in a portable telephone equipment.

2. Description of the Related Art

Nowadays, a portable telephone system is put to practical use in all the countries of the world. A communication terminal equipment has rapidly improved to have multi-functions in order to realize various services by using the system.

By the way, as an electronic mail in which a short sentence (hereinafter referred to as a short message) can be sent and received has spread by the development of computers, the same function is demanded in portable terminal equipment.

However, in a conventional portable terminal equipment, when a short message is sent and received, there has been a problem that few types of input keys or a small picture of an LCD (Liquid Crystal Display) for displaying letters cause difficulty in inputting a sentence. Moreover, when a message is returned to reply to the reception, there has been a problem that a response can not be expressed exactly because of reduced usable display information.

SUMMARY OF THE INVENTION

In view of the foregoing, an object of this invention is to provide a communication terminal equipment and a communication method in which, a message can be made easily.

The foregoing object and other objects of the invention have been achieved by the provision of communication terminal equipment having receiving and sending functions of message information, comprises: storing means for storing message information; display means for displaying message information and plural setting items which show correspondence processing on the message information; input means for inputting message information and selecting plural setting items which show correspondence processing on the message information; and control means for reading said message information from said storing means to display said message information on said display means, and then for displaying plural setting items which show correspondence processing on said message information to execute the correspondence processing on said displayed message information on the basis of a setting item selected by said input means.

Further, a control method of the communication terminal equipment having receiving and sending functions of message information, wherein: message information is stored; the stored message information is read out and displayed; plural setting items which show correspondence processing on said displayed message information are displayed; a setting item is selected among said plural setting items; and correspondence processing on said message information displayed corresponding to the selected setting item is executed.

The message information read out from the information storing means is displayed on the display means, and with respect to the message information displayed by the simple input operation, and desired processing can be executed.

The nature, principle and utility of the invention will become more apparent from the following detailed description when read in conjunction with the accompanying drawings in which like parts are designated by like reference numbers or characters.

DETAILED DESCRIPTION OF THE EMBODIMENT

Figure 1:
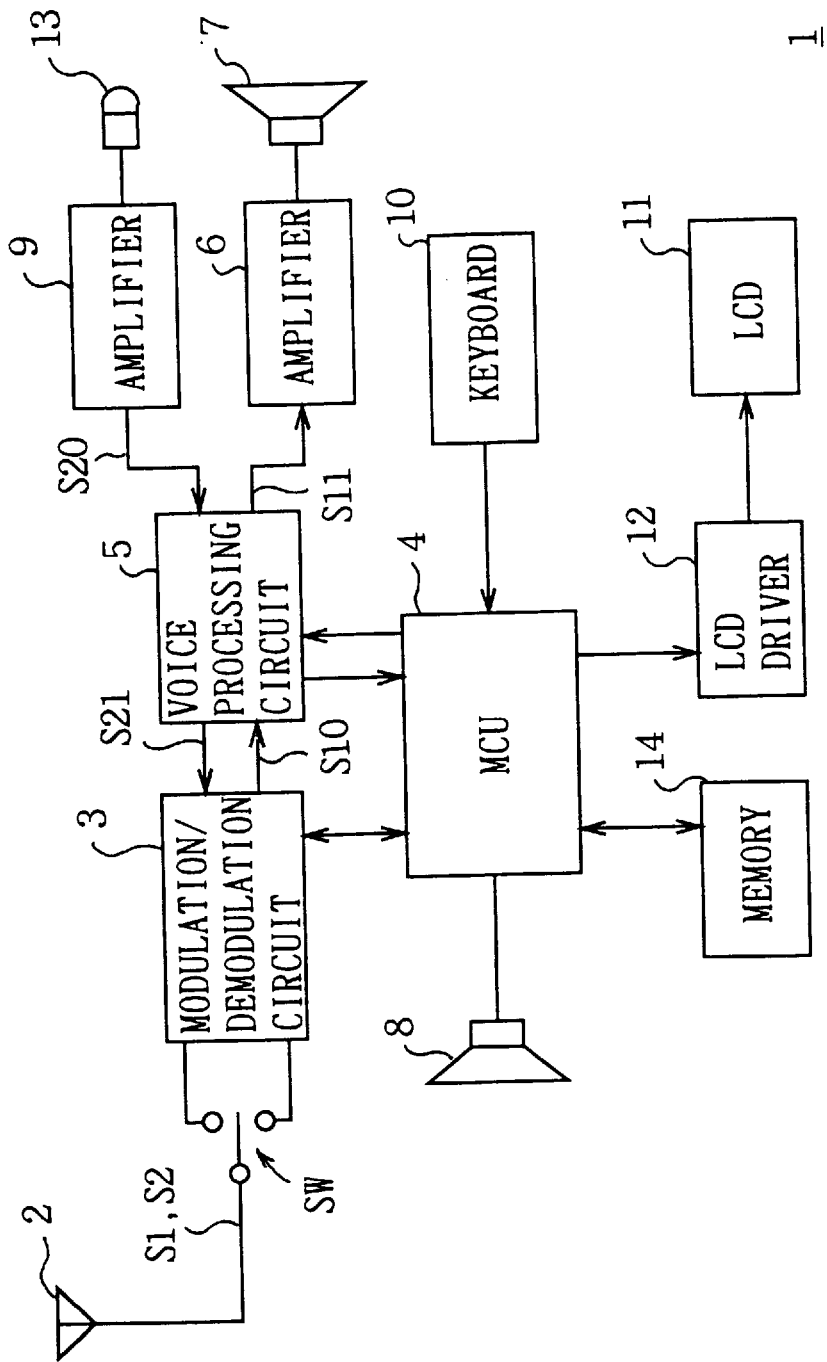
FIG. 1 is a schematic diagram showing the whole constitution of a communication terminal equipment according to the embodiment.

Preferred embodiments of this invention will be described with reference to the accompanying drawings:

In FIG. 1, a portable telephone equipment 1 is shown as a whole. A RF signal S1 is received by an antenna 2 and is demodulated at a modulation/demodulation circuit 3 by control from a MCU 4 to be output to a voice processing circuit 5 as a baseband signal S10. The voice processing circuit 5 decodes the digital baseband signal S10 demodulated in accordance with the control of the MCU 4 and outputs the received data to the MCU 4. At the same time, the analog audio signal S11 which is speaking data is supplied to an amplifier 6. The analog audio signal S11 is amplified at the amplifier 6, thereafter, converted by a speaker 7 into an audible voice. Further, the MCU 4 operates a ringer 8 at this time in response to the reception to inform the reception to a user. Further, the received reception data is stored temporarily in a buffer memory (not shown) to use in the processing by the communication additional function.

While, in sending, the telephone number is first inputted by keys from a keyboard 10 referring to the display picture of the LCD 11. The LCD 11 displays the telephone number inputted by keys on the screen through a LCD driver 12 which is controlled by the MCU 4. When the communication circuit is connected, voice is gathered by a microphone 13, and converted into an analog audio signal to be amplified at an amplifier 9. The analog audio signal S20 output from the amplifier 9 is converted into the digital audio signal at the voice processing circuit 5, and outputted to the modulation/demodulation circuit 3. The modulation/demodulation circuit 3 modulates a baseband signal S21 generated from the digital audio signal into a RF signal S2 and a switch SW is switched to a sending side to transmit the signal by the antenna 2.

Here, the reception and sending of a short message is set in the portable telephone equipment 1. The short message is made by inputting keys using the keyboard 10 on the picture of the LCD 11 and is sent by a specified communication additional function. The short message is also made by reading out the sentence pattern of the letter information which has been previously stored in a memory 14 comprising information storing means to edit it on the picture of the LCD 11. The letter information is formed by symbols which contains letters, numerals, lines, etc. Moreover, the reply to the reception of the short message can be set by selecting a reply processing such as the reply which sends out the short message to reply, the CC (Carbon Copy) which refers to the message sent before and makes the short message to reply, and the automatically call telephone number of sender.

In the above construction, the procedure of a short message will be described referring to flow charts shown in FIGS. 2 to 5.

Figure 2:
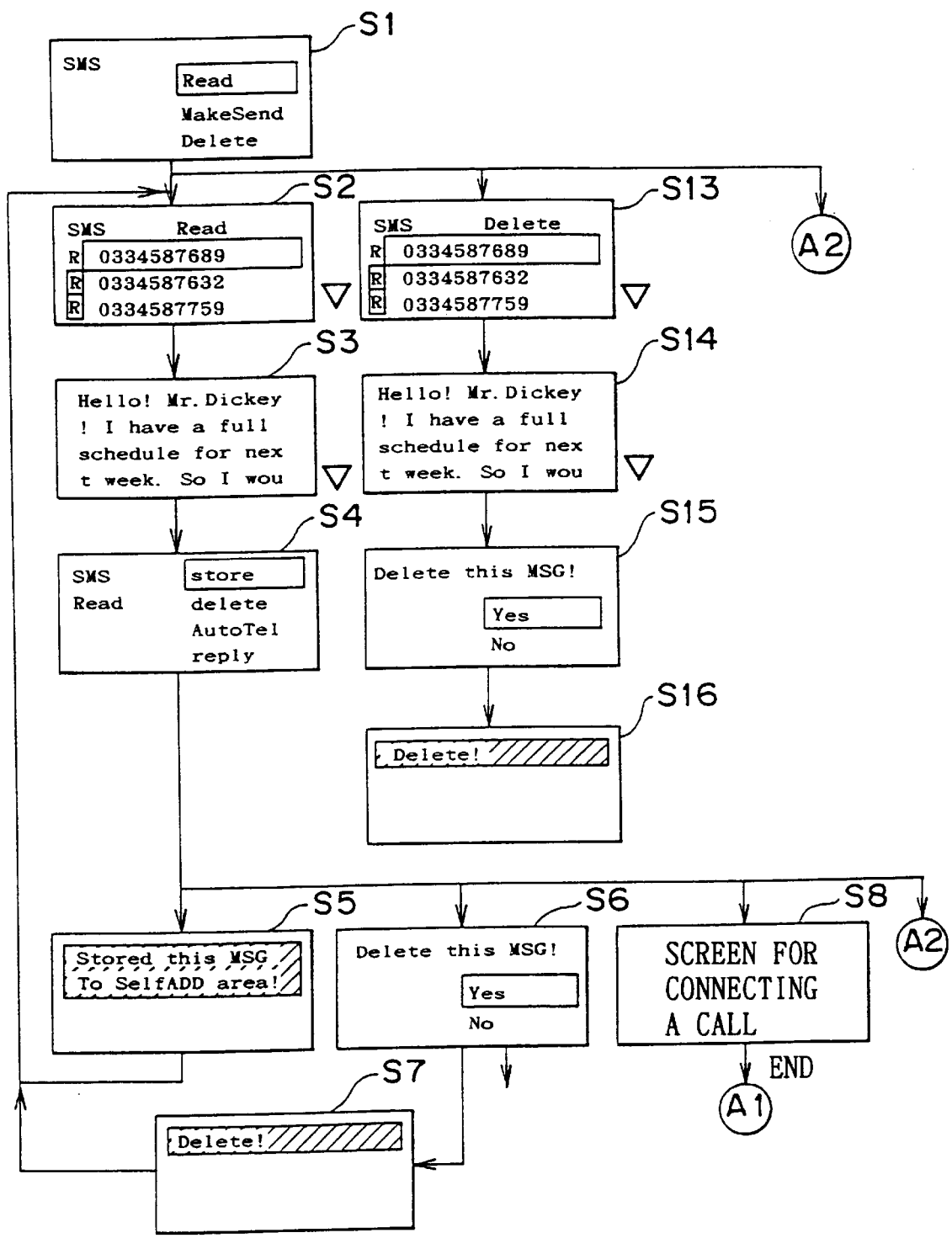
FIGS. 2 to 5 are schematic diagrams explaining the procedure of sending a short message.
Figure 3:
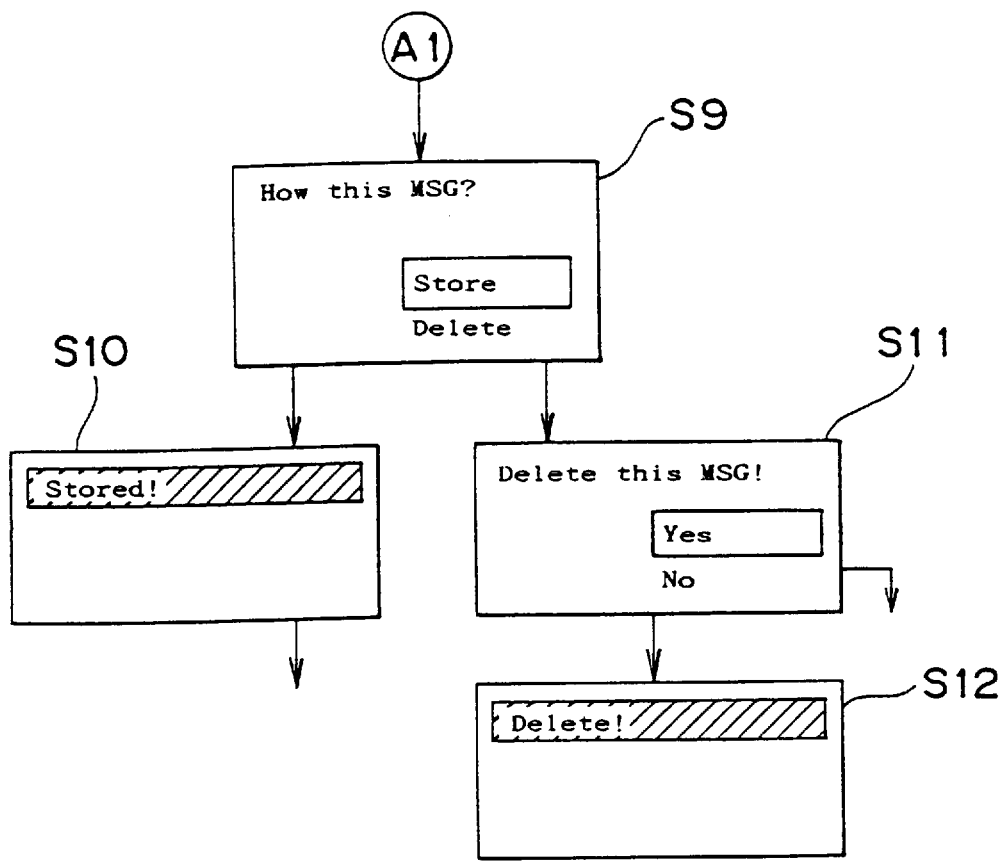

In FIG. 2, the selection items which are "Read" (read a message), "MakeSend" (make and send a message), and "Delete" are displayed on the screen S1 which is a first screen of the procedure. A cursor is matched with one of these items and is clicked. Here, when "Read" is selected, the telephone number of the sender is displayed on the screen S2. When a cursor is matched with the telephone number of the sender whose message is desired to be read on the screen S2 and clicked to select, the content of the desired message is displayed on the screen S3.

After the message has been read, the selection items which are "store" (store the short message sent), "delete" (delete the message), "AutoTel" (telephone automatically), and "reply" are displayed on the next screen S4, and one of these items is selected. Here, when a cursor is matched with "store" and clicked, a processing proceeds to the processing of storing the message. If it succeeds to store, "Stored! this MSG To SelfADD area!" showing the success of storing the message is displayed on the screen S5, thereafter, the display returns to the screen S2.

Further, when "delete" to delete a message is selected on the screen S4, the display changes to the screen S6 first and confirms again if the used message is deleted. When a cursor is matched with "Yes" here and clicked to select, "Delete!" showing the execution of deletion is displayed on the next screen S7. After the deletion, the display returns to the screen S2. Also, if the deletion is canceled here, the display returns to the screen S4 as it is.

Further, on the screen S4, a cursor is matched with "AutoTel" and clicked to select, the screen for connecting a call of the screen S8 is displayed, and the device calls to speak to the sender whose message has been read now. At this time, when finishing speaking, the display changes to the screen S9 to select either of "Store" to store the received short message or "Delete". Here, when a cursor is matched with "Store" and clicked to select, a screen changes to the screen S10 where "Stored!" showing the execution of storing is displayed on the screen S10, thereafter, the display returns to the screen S1 (FIG. 2). While, when a cursor is matched with "Delete" here and clicked to select, the display changes to the screen S11. The deletion of the short message is confirmed here again, and then "Delete!" showing the execution of the deletion is displayed on the screen S12, thereafter, the display returns to the screen S1. Also, when the deletion is canceled on the screen S1 for confirmation, the display turns to the screen S4 as it is.

Further, when "Delete" to delete a received message is selected on the screen S1, a screen changes to the screen S13 to display the telephone number of the sender. When the telephone number of a sender whose message is desired to be deleted is selected on the screen S13, the display changes to the screen S14 where the content of the message sent is displayed. After the content of the message received is confirmed on the screen S14, the display changes to the screen S15 where it is displayed if the used message is deleted to confirm again. When a cursor is matched with "Yes" and clicked to select, the deletion is executed and then "Delete!"is displayed on the screen S16. After the deletion, the display returns to the screen S1. Also, when "No" is selected to cancel the deletion, the display returns to the screen S1 as it is.

Thus, in the portable telephone equipment 1, the received message is read out, and the processing such as storing and deletion of the received message, automatically telephoning to the sender, or a reply can be executed by a simple operation which only specifies the selection item of each function displayed on the picture of LDC 11 and clicks by a cursor.

Further, when "MakeSend" signifying that a message is made and sent is selected on the screen S1, a screen changes to the screen S20 (FIG. 4) for setting the making short message. In the similar way, when "reply" is selected on the screen S4, a screen changes to the screen S20 for setting the making short message.

Next, the procedure of sending a short message shown in FIG. 4 will be explained. The procedure of sending a short message first selects the method for making a short message on the screen S20. More specifically, the selection items are set on the screen S20, which are "NEW" signifying that a sentence is newly made by inputting keys; "UsePttrn" signifying that a sentence is made by using a previously prepared sentence pattern; "SelfADD" signifying that a sentence is made by referring to the message of a sentence which has been sent before; and "Received" signifying that a sentence is made by referring the received message for a reply. Here, when a cursor is matched with "NEW" signifying that a sentence is newly made by inputting keys and clicked to select, a screen changes to the screen S21 where a sentence of the message to be made by inputting keys from a key board 10. The screen S21 scrolls up as shown in the screen S22 when an input line becomes full of words.

After the sentence of a short message has been inputted, a screen changes to the screen S23 to select whether the made short message is sent or not. When the sending is selected, a screen changes to the screen S24, and a cursor is matched with any of the methods of inputting a telephone number to be telephoned and clicked to select. That is, methods for selecting a telephone number to be telephoned are: "TelDir" which is a method of obtaining data from a telephone number book stored in a predetermined information storing means memory 14; "Redial" which is a method of re-dialing the telephone number stored in a buffer memory (not shown); and "Normal" which is a method of inputting a telephone number normally. When the reply function described above is used here, the telephone number received last is displayed on the screen S25 as a telephone number to be telephoned.

Figure 5:
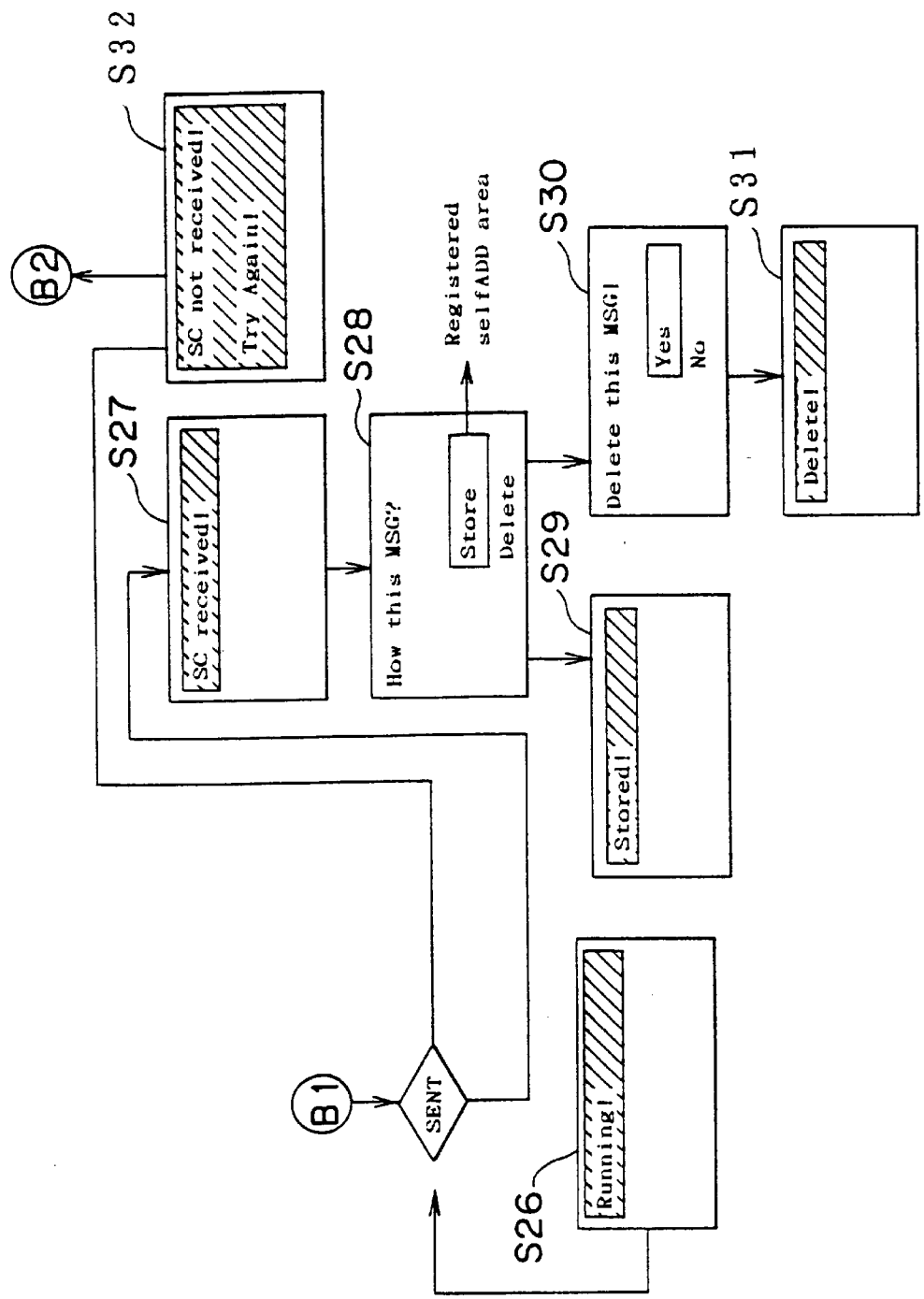

Then, "Running!" is displayed on the screen S26 shown in FIG. 5 during the transmission. When the transmission succeeds, a screen changes to the screen S27 where the success of transmission is displayed by "SC received!" informing the user that the service center (SC) has received the transmissions. After that, either of "Store" signifying that the presently used message is stored or "Delete" is selected. When a cursor is matched with "Store" and clicked to select, a screen changes to the screen S29 where "Stored!" is displayed and then returns to the screen S1. Also, when "Delete" is selected, a screen changes to the screen S30 where it is confirmed again whether the deletion is executed or not and, thereafter, changes to the screen S31 where "Delete!" is displayed, and then returns to the screen S1. Further, when the deletion is canceled on the screen S30, a screen returns to the screen S1 as it is.

Figure 4:
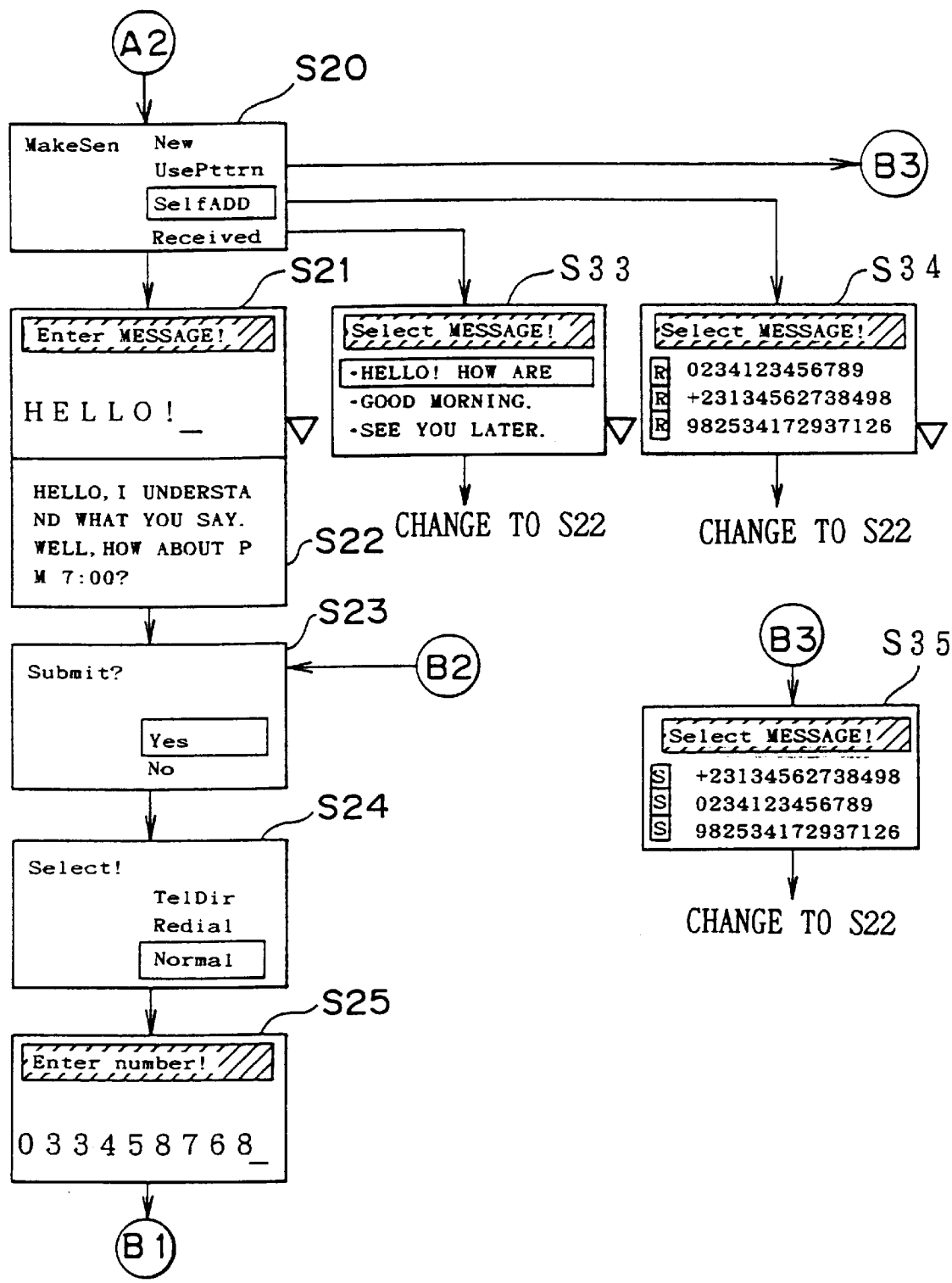

Also, in the case where the telephone number to be telephoned is input on the screen S25 (FIG. 4) and then the service center fails to receive it during the transmission, "SC not received! Try Again!" is displayed on the screen S32 (FIG. 5) and returns to the screen S23 (FIG. 4). On the screen S23, the content of the short message to be sent is confirmed again, and the operation of inputting the telephone number is retried.

Further, on the screen S20, when a cursor is matched with "UsePttrn" and clicked to select, a screen changes to the screen S33 where a sentence message which has been previously stored in the memory 14 is read out to display a sentence used to make a short message on the LCD 11 as a sentence pattern. A cursor is matched with a desired sentence pattern from the sentence patterns displayed on the scroll picture of the screen S33 and clicked to select. Moreover, when a cursor is matched with "SelfADD" and clicked to select, a screen changes to the screen S34 where a sentence of a message sent before is selected based on the telephone number of a sender. That is, sentence patterns corresponding to the telephone number has been previously stored in the memory 14, and the desired sentence pattern can be read out in accordance with the telephone number.

Also, when "Received" is selected, a screen changes to the screen S35 where the received message is used to a message to be sent. Then, a screen changes from the screen S33, S34, or S35 to the screen S22 where a message is corrected or added to edit a sentence on a keyboard 10. Thereafter, the process after the screen S22 is executed in accordance with the same process as the described case where a sentence is newly made by inputting from the keys newly (the screen S22 to the screen S35), and a short message is sent out.

The sentence of a short message to be sent out is made by editions, such as correction or addition, the sentence patterns which have been previously stored in the memory 14 or the sentence of the short message which has been received before. Therefore, a troublesome operation of inputting characters in making a sentence can be widely reduced.

According to the above constitution, in the portable telephone equipment 1, in a case where a short message is sent and received, the selection items displayed on the screen are specified with a cursor and clicked on the LCD 11 in accordance with the setting procedure, to be selected easily.

Further, according to the embodiment described above, the sentence pattern which has been previously made and stored in the memory 14 or the message which has been received before is used to correct or add the short message to be sent out, so that a troublesome operation of making a sentence can be widely reduced.

Note that the embodiments discussed above have dealt with the case where a portable telephone equipment is used as a communication terminal equipment. However, the present invention is not limited to this but other general communication terminal equipment such as a wired communication equipment can be widely used as a communication terminal equipment.

Further, note that the embodiments discussed above have dealt with the case where the short message is sent and received as message information. However, the present invention is not limited to this but a voice message being the voice information can be sent and received as message information.

According to the present invention described above, the message information read out from information storing means is displayed on display means and is edited by input means, so that a communication terminal equipment and the communication method can be realized, in which the message information can be made by simple inputting.

While preferred embodiments have been described in connection with the present invention, it will be obvious to those skilled in the art that various changes and modifications may be made, therefore, to cover in the appended claims all such changes and modifications as fall within the true spirit and scope of the invention.

What is claimed is:

1. A communication terminal equipment having receiving and sending functions of message information, comprising:

storing means for storing said message information;

display means for displaying said message information and a plurality of setting items which show corresponding respective processing on said message information;

input means for inputting said message information and selecting said plurality of setting items which show said corresponding processing on said message information; and control means for reading said message information from said storing means to display said message information on said display means, and then for displaying said plurality of setting items which show said corresponding processing on said message information to execute said corresponding processing on said displayed message information on the basis of at least one of said plurality of setting items selected by said input means, wherein said control means displays said plurality of setting items including a store of said message information, a deletion of said message information, a call to a sender who has sent said message information, and a response by a response message information to the sender who has sent said message information, as said plurality of setting items which show said corresponding processing on said message information and said control means, in the case where the setting item for the call to the sender who has sent said message information is selected among said plurality of setting items which show said corresponding processing on said message information by said input means, upon completion of the call, displays the setting items for a store of said message information and for a deletion of said message information on said display means.

2. The communication terminal equipment according to claim 1, wherein said control means, in the case where the setting item for a response by said message information to the sender who has sent said message information is selected among said plurality of setting items which show said corresponding processing on said message information by said input means, displays the setting items for a newly making of message information, a use of previously prepared message information, and a reference of previously sent message information and received message information on said display means in order to make said response message information.

3. The communication terminal equipment according to claim 2, wherein said control means makes and sends said response message information, and then displays the setting items for a store of said response message information and a deletion of said message information on said display means.

4. A control method of a communication terminal equipment having receiving and sending functions of message information, wherein:

said message information is stored as stored message information;

said stored message information is read out and displayed as displayed message information;

a plurality of setting items which show corresponding processing on said displayed message information are displayed;

a setting item is selected as a selected setting item among said plurality of setting items; and corresponding processing on said displayed message information corresponding to said selected setting item is executed, wherein the setting items for a store of said message information, a deletion of said message information, a call to a sender who has sent said message information, and a response by a response message information to the sender who has sent said message information are displayed, as said plurality of setting items which show said corresponding processing on said message information and wherein in the case where the setting item of the call to a sender who has sent said message information is selected among said plurality of setting items which show said corresponding processing on said message information by said input means, upon the completion of the call, the setting items for a store of said message information and for a deletion of said message information are displayed.

5. The control method of the communication terminal equipment according to claim 4, wherein in the case where the setting item for a response by said message information to the sender who has sent message information is selected among said plurality of setting items which show said corresponding processing on said message information, the setting items for newly making of message information, a use of previous prepared message information, and a reference of previously sent message information and received message information are displayed.

6. The control method of the communication terminal equipment according to claim 5, wherein said response message is made and sent, and then setting items of said plurality of setting items for a store of said response message information and for a deletion of said message information are displayed.

* * * * *